I. B. NAYLOR.
IRRIGATING CONDUIT.
APPLICATION FILED NOV. 23, 1912.
1,078,636.
Patented Nov. 18, 1913.
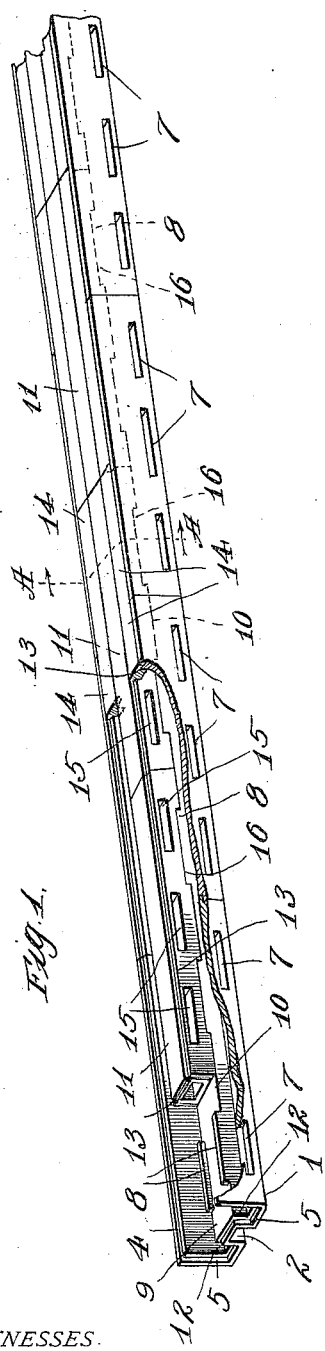
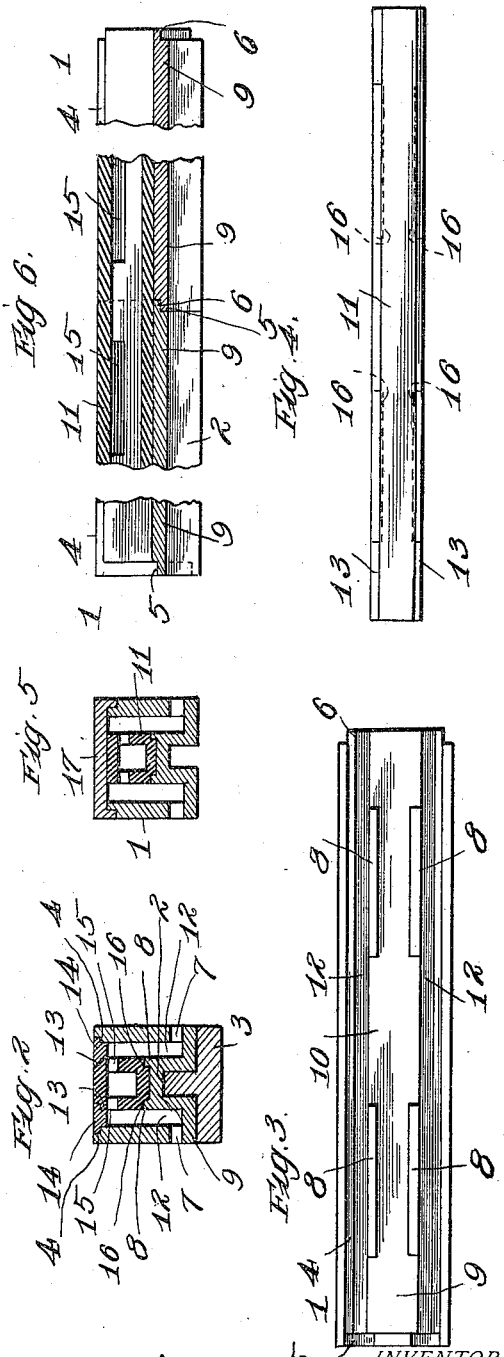

UNITED STATES PATENT OFFICE.

ISAAC B. NAYLOR, OF NEW YORK, N. Y.

IRRIGATING-CONDUIT.

1,078,636.     Specification of Letters Patent.     Patented Nov. 18, 1913.

Application filed November 23, 1912. Serial No. 733,170.

*To all whom it may concern:*

Be it known that I, ISAAC B. NAYLOR, a citizen of the United States, residing at New York, in the county of New York and State of New York, have invented certain new and useful Improvements in Irrigating-Conduits, of which the following is a specification.

The object of my invention is to apply water to land so as to promote vegetable life thereon, without loss of water by evaporation or by oversupply. I do this by carrying the water in a pipe system underground, free of contamination and obstruction, so that when the water comes into contact with the soil by overflow from the pipe, it ascends by natural capillary action to the roots of any vegetation growing thereon or to any seeds or bulbs sown or planted therein within its radius.

A still further object of my invention is to control the flow of the water into the soil in such manner that all danger of undermining at the point of exit is eliminated.

A still further object of my invention is to construct the conduit so as to prevent the soil washing into the main body of water, whereby I am enabled to maintain a steady, regular flow of water of equal volume throughout the system, besides which the soil of one field is not carried by the main body of water to another field; and with these and other objects in view my invention consists of the parts and combination of parts as will be more fully hereinafter pointed out.

In the drawings: Figure 1 is a perspective view of a portion of a conduit, embodying my invention, parts being in section. Fig. 2 is a sectional view on the line A—A Fig. 1: Fig. 3 is a top plan view of one of the base sections. Fig. 4 is a top plan view of the pipe section. Fig. 5 is a transverse sectional view of a conduit showing another embodiment of my invention. Fig. 6 is a longitudinal central sectional view of Fig. 1, parts being broken away.

The reference numeral 1 designates the base section provided with a groove 2 in its under face extending the length thereof into which an anchor 3 is adapted to fit. Said anchor may be of any approved material and serves to hold the sections in alinement with each other as fully explained in my application filed October 18, 1912, Serial No. 726,554. The side walls of the base are provided with a rabbet 4 on their top edge, while one end of the walls and base is provided with a rabbet 5; at the other end the base is provided with an integral tongue 6 constructed to fit into the rabbet 5 of an adjacent section 1. The side walls of the base member are provided with elongated slots 7 leading from the bottom of the channel formed between the side walls of the base and the side walls of the groove 2.

8 are ribs, formed integrally with the top wall 9 of the groove, arranged in pairs and opposite each other, there being a space 10 between consecutive pairs. The ribs and the space 10 are of exactly the same length except the space at the ends of the sections which is exactly one half the length of the intermediate spaces, so that when two sections are placed end to end the combined end spaces of the two abutting sections equal one of the intermediate spaces the object of which will be hereinafter pointed out.

The main water pipe or conduit 11 is constructed in sections of a length equal to the length of the base sections and the pipe sections are arranged so as to break joint with the base sections so that all leakage that may occur at the joint between the conduit sections will fall into the channels 12 of the base sections. The top wall of the main water pipe or conduit 11 is provided along each side edge with a rabbet 13 corresponding with the rabbet 4 in each side wall of the base section, the said rabbets 4 and 13 being constructed to receive caps 14 to close the respective channels 12.

15 are elongated ducts constituting overflow exits at the top of the side walls of the conduits leading into the channels 12 whereby water may overflow from the conduit into said channels and from thence through the elongated slots 7 into the soil.

The conduit sections are provided with rabbets 16, in their lower corner edges, there being preferably two pairs of rabbets as shown which are constructed to receive the ribs 8 thereby forming an interlock between the base section and conduit whereby they are secured together against relative sidewise and lengthwise movement. The ribs 8 and rabbets 16 are made standard as are the base and conduit sections in order that the parts may be interchangeable thus facilitating repairs, assembly and minimizing cost of manufacture. The joints between the ends of the sections and conduit may be sealed by cement and a thin layer of cement may be laid under the conduit sections.

In Fig. 5 I have shown the cap 17 extending from one side to the other of the base section, thus omitting the rabbet 13 shown in the other figures. In all other respects the construction shown in Fig. 5 is the same as shown in the other figures.

Having thus described my invention what I claim is:

1. An irrigating conduit comprising a base member having a groove in its under face and channels in its upper face, ribs between said channels, and a main water pipe having rabbets constructed to receive said ribs.

2. An irrigating conduit comprising a base member having a groove in its under face, and channels in its upper face, ribs between said channels, a main water pipe having rabbets constructed to receive said ribs, and a covering closing said channels at the top.

3. A rectangular irrigating conduit comprising a base having side walls with rabbeted upper edges, one end of said conduit being rabbeted, and the other end provided with an extending tongue, a groove in the under face of the base and exit ports in the side walls, ribs arranged in pairs, said pairs being spaced an equal distance apart on said base, and a main water pipe of rectangular cross section having rabbets formed in the lower edges thereof and spaced relative to and constructed to receive said ribs, a cover for the conduit, and overflow ports leading from said pipe into said base.

4. In a rectangular irrigating conduit the combination with a series of base members formed with interlocking abutting ends and having channels formed therein at each side thereof, ribs arranged in pairs and spaced from each other and positioned between said channels, exit ports in the outer side walls of said channels, of a series of rectangular main water pipe sections laid in and breaking joint with said base members, and having their lower corner edges provided with rabbets spaced to receive the ribs on the base members, overflow ports leading from the main water pipe into the channels of the base member, and a cover for said channels.

In testimony whereof I affix my signature in presence of two witnesses.

ISAAC B. NAYLOR.

Witnesses:
  EDWIN S. CLARKSON,
  BENNETT S. JONES.

---

Copies of this patent may be obtained for five cents each, by addressing the "Commissioner of Patents, Washington, D. C."